Sept. 22, 1936.  L. C. COREY  2,054,875
SAUSAGE MAKING EQUIPMENT
Filed April 1, 1935  2 Sheets—Sheet 1

INVENTOR
Lewis C. Corey.
BY
ATTORNEY

Sept. 22, 1936. L. C. COREY 2,054,875
SAUSAGE MAKING EQUIPMENT
Filed April 1, 1935 2 Sheets-Sheet 2
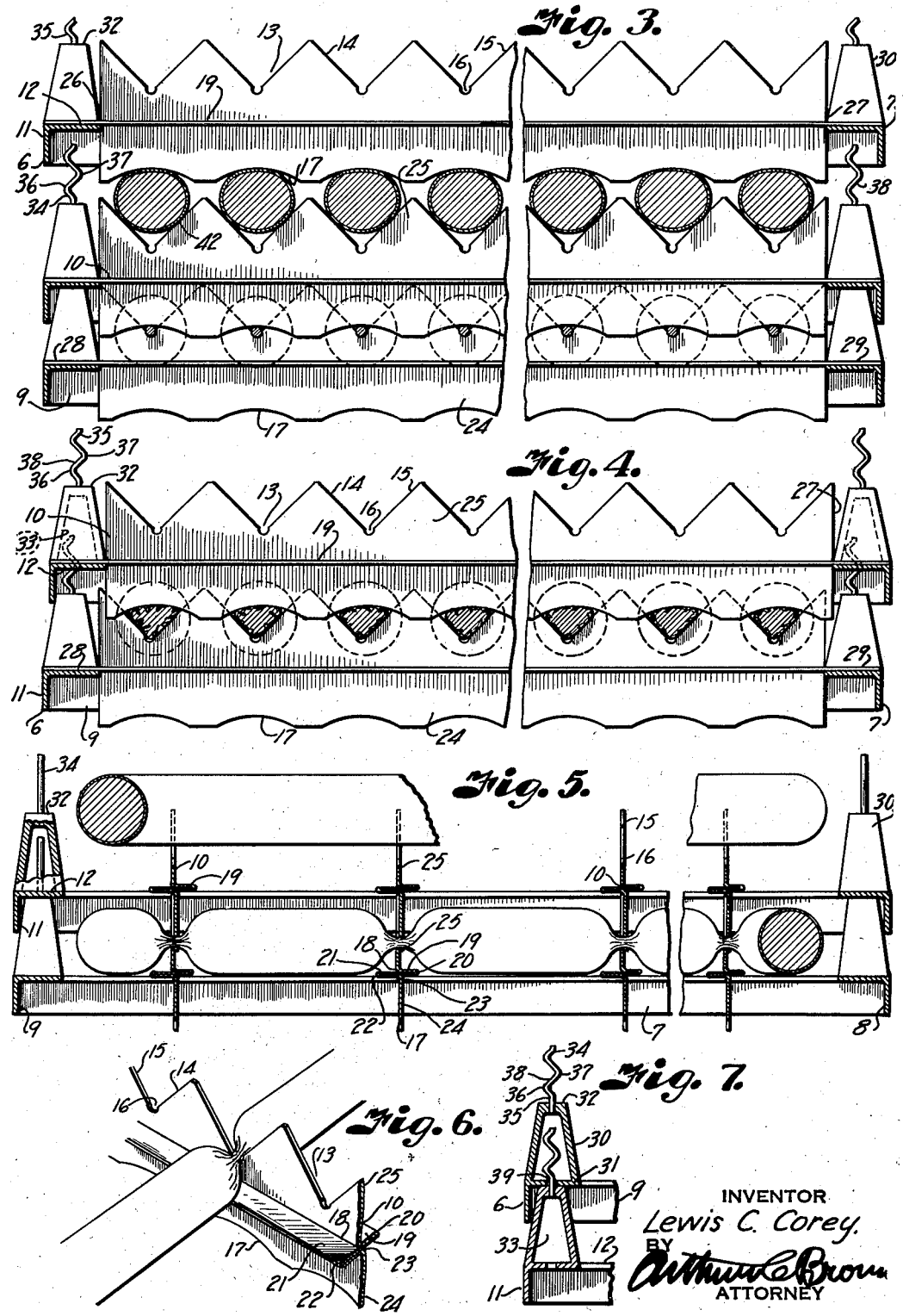
INVENTOR
Lewis C. Corey,
BY
Arthur C. Brown
ATTORNEY Patented Sept. 22, 1936

2,054,875

UNITED STATES PATENT OFFICE 2,054,875

SAUSAGE-MAKING EQUIPMENT

Lewis C. Corey, Tulsa, Okla.

Application April 1, 1935, Serial No. 14,031

17 Claims. (Cl. 17—34)

This invention relates to cased sausage making equipment and more particularly to a method and apparatus for forming and retaining the links in a sausage casing preparatory to and while the sausage is smoked and/or cooked and has for its principal objects to facilitate formation of the links, to reduce cost of manufacture of cased sausages, to promote sanitation, and to produce a uniform product.

Further objects of the invention are to provide a method and apparatus particularly suitable to linking of artificial casings and to provide for storing of the sausages after processing.

In accomplishing these and other objects of the invention, as hereinafter pointed out, I have provided improved details of structure, the preferred form of which is illustrated in the accompanying drawings, wherein:

Fig. 3 is a cross sectional view through a plurality of linking frames illustrating the superimposition of a frame to effect constriction of the casings in formation of the links.

Fig. 4 is a view similar to Fig. 3 showing the casings in a further state of constriction.

Fig. 5 is a longitudinal section through a plurality of superimposed linking racks.

Fig. 6 is a detail perspective view of a portion of one of the linking bars and showing a portion of the sausage casing constricted to form the links.

Fig. 7 is a detail section through the frame spacing means, particularly illustrating the cam guides for effecting lateral reciprocation of the frames as they are moved to link forming position.

Figure 1:
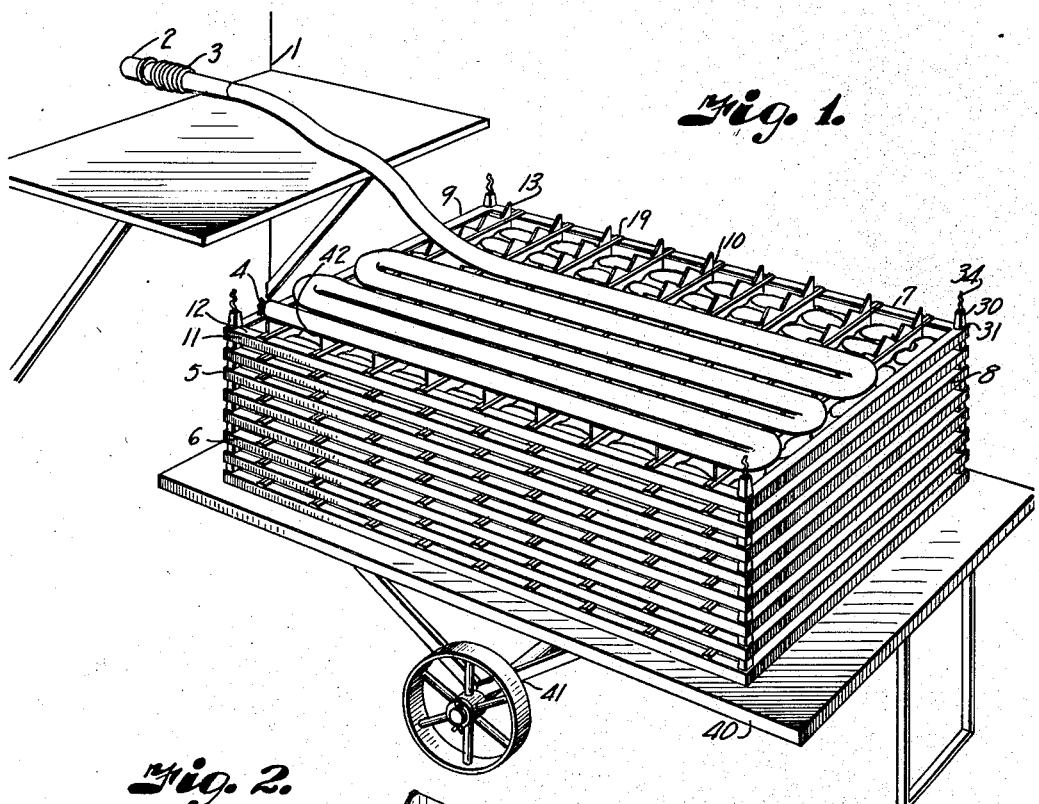
Fig. 1 is a perspective view of a sausage linking apparatus constructed in accordance with the present invention.

Referring more in detail to the drawings:

1 designates a casing filling machine including a nozzle 2 through which the sausage filler is progressively injected into the sausage casing 3 that is sleeved over the end of the nozzle as in customary practice, the free end of the casing being tied by a suitable constrictor 4 to prevent extrusion of the filling from the free end of the casing.

The machine 1 and method of filling the casing form no part of the present invention but are included to better illustrate the advantages of my improved method and apparatus for linking the casing, as now to be described.

My improved linking apparatus includes a plurality of frames 5, each including longitudinal side members 6 and 7 connected by end members 8 and 9 to form a rectangular structure for supporting a plurality of spaced casing supporting and linking members or plates 10 later described.

The frame members 6—7 and 8—9 preferably comprise angle bars having vertical flanges 11 forming the periphery of the frame and horizontal flanges 12 extending inwardly to form a ledge for supporting the ends of the members 10. The members 10 are preferably formed of plate material and have their upper edges provided with a plurality of spaced notches 13 preferably of V-shape and having the side edges 14 and 15 converging inwardly and downwardly to terminate in substantially semi-circular notches 16 to accommodate the constricted or linking portions of the casing as later described.

The opposite edges of the plates are provided in vertical alignment with the V-shaped notches with a similarly spaced series of arcuate notches 17 to engage the upper surface of the filled casings that are seated in the V-shaped notches of the next lower frame.

The plates are preferably formed of sufficient width so that the intermediate portion thereof may be bent laterally as at 18 to form a lateral flange 19 and then retractively as at 20 to form a lateral flange 21 projecting from the opposite side of the plate. The plate is again bent retractively as at 22 to a point in substantial alignment with one side face of the vertical portion of the plate having the notches 13 and at which point the edge of the plate carrying arcuate notches 17 is bent downwardly as at 23 so that the depending vertical portion 24 thereof is slightly offset with respect to the vertical upper portion 25 in such a manner that the face of the portion forming the vertical part 25 is in a plane with the opposite face of the portion forming the depending part 24.

The plate shaped as described is of sufficient length to extend completely across the frame and the ends of the vertical portions thereof are notched back as at 26 and 27 so that they are substantially the same length as the inner width of the frame between the terminal edges of the horizontal flanges 12. The remaining horizontal flange portions of the plates thus project from the ends of the vertical portions to provide supporting arms 28 and 29 adapted to rest upon the horizontal flange 12 of the frame and which are fixed thereto by welding or other suitable fastening means so that the vertical portions of the plates are retained in perpendicular and parallel alignment.

The laterally projecting side flanges 19 and 21 formed by the intermediate braces of the plate constitute stiffening ribs whereby the vertical portions are kept in transverse alignment so that when one of the frames is superimposed on another, the side face of the depending portions 24 of the plates of an upper frame will overlappingly engage the opposite face of the upper plate portion of a lower frame to effect formation of the sausage links as later described. The plate members thus described are spaced along the longitudinal members of the frame distances equivalent to the lengths of the sausage links to be formed.

In order to support the frames in superimposed spaced relation with each other, so that the arcuate edges 17 of the plates of an upper frame terminate short of the bottom of the notches 16, each frame is provided at the corners thereof with spacing blocks 30.

The spacing blocks 30 include truncated pyramids having rectangular bases 31 welded or otherwise attached to the horizontal flanges 12 and have flattened upper ends 32 for engaging the under side of the flanges as best illustrated in Fig. 7. The tapering side portions of the spacers thus provide for accommodation of the vertical flanges 11 of the frames when superimposed. The spacers 30 are preferably hollow to provide recesses 33 therein to accommodate cam shaped guide members 34 when the frames are in superimposed relation.

The guide members 34 comprise rods 35 having their lower ends fixed to the flat upper ends 32 of the spacers and have their upper ends formed in zig-zag bends 36 and 37 extending equally from opposite sides of the axes of the pyramidal spacers. The bar portions 38 intermediate the zig-zag bends of the guides thus form cam surfaces for effecting lateral shifting movement of the frames as they are moved in superimposed position upon each other, the horizontal flanges 12 being provided with openings 39 in the axes of the spacers to provide guide openings to receive the upwardly projecting guides of a lower frame as shown in Fig. 7.

In linking the filled sausage casing on the frames thus described, one of the frames is placed on the platform 40 of a suitable truck 41 that may be wheeled into close proximity with the filling machine 1.

Figure 2:
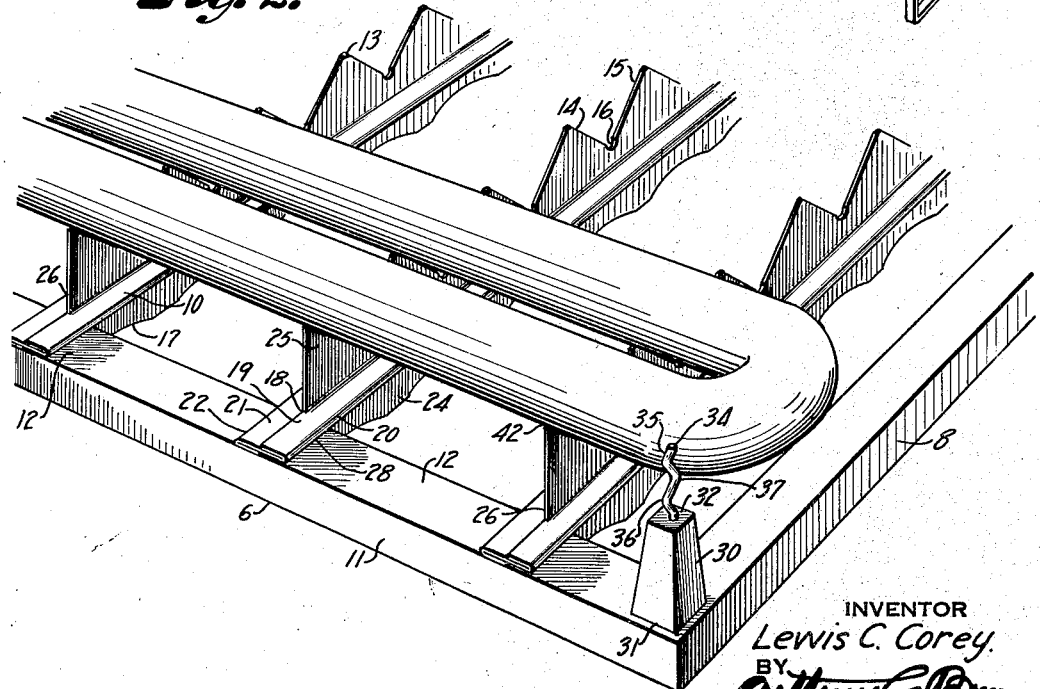
Fig. 2 is an enlarged detail perspective view of a corner of one of the linking frames, particularly illustrating application of the stuffed casing preparatory to formation of the links.

As the filled casing is extruded from the nozzle, the casing is seated in the first row of aligning notches of the upper portions of the plates, extended to the opposite end of the frame and then back again in the second row of notches in the form of hair-pin loops as indicated at 42 in Figs. 1 and 2. The notches 13 are proportioned in size and spacing to conform to the diameter of the casing so that there is a material lateral space maintained between the lengths of casing supported in the respective rows of notches.

After all of the notches have been filled in the frame as shown in Fig. 1, a second frame is superimposed over the filled frame so that the upper ends of the cam guides 35 enter the guide openings 39 of the frame being superimposed. Then as the superimposed frame settles into position upon the links of filled sausage casing the arcuate shaped notches of the depending portions of the plates engage the upper peripheries of the sausages to constrict the sausage casings within their V-shaped seats by pressing the sausage filling longitudinally of the direction of the casings. Upon final seating of the upper frame, the casings are moved into the semi-circular notches 16 as shown in Fig. 3.

Simultaneously with the vertical movement of the upper frame onto the lower frame, the upper frame is shifted back and forth in the longitudinal direction of the plates by reason of the oppositely inclined portions 38 of the cam guides to assist in displacement of the filling where the casings pass across the respective engaging portions.

This is a most important feature of the present invention as it prevents pressure of the upper frame from bursting the casing. The lateral shifting movement simultaneously with the downward compression effects the gradual pressing or squeezing out of the filling and prevents fracture of the casing. While this is important in connection with formation of the links in animal casings, it is particularly important, and renders feasible the use of my apparatus for linking artificial casings.

The frame just superimposed on the lower frame is then filled in the same manner as described in filling the first, and a third frame is then superimposed on the second frame. After a suitable number of frames have been superimposed and filled, the entire stack of frames is wheeled to the smoke room where the frames are removed as a unit by means of a suitable derrick or hoist, not shown, and suspended within the smoke chamber.

Due to the lateral vertical spacing of the sausage links, as well as the spacing afforded by the spacers 30, the smoke contacts all surfaces of the sausages to produce a uniformly smoked product of substantially uniform color and taste.

After the smoking process is completed, the entire stack of frames is removed as a unit and immersed in the cooking vessel by means of the derrick.

The spacing of the sausage links is also important in the cooking process as it allows the water to move entirely around the respective sausages to insure their cooking. After cooking, the frames carrying the processed sausages may be replaced on the derrick and wheeled to the storage room, where the sausages may be left within the racks until they are packed. Due to the spacing of the sausages by the frames, air circulates completely thereover to prevent spoilage of the products and they therefore can be stored for longer periods.

This is also important as it permits storage of the sausages before cooking if desired.

From the foregoing it is apparent that I have provided an improved method and apparatus for linking of sausages which not only facilitates and reduces the cost of the linking operation, but provides for a better and more uniform product due to the fact that all of the sausages are equally exposed to the action of the smoke and cooking liquid and, when placed in storage, the sausages are all uniformly cooled to prevent spoilage.

By use of the frames as a unit, the sausages are not directly handled between the filling and packing steps, and are, therefore, retained in a more sanitary condition than in present methods of cased sausage manufacture.

What I claim and desire to secure by Letters Patent is:

1. A sausage linking apparatus including a plurality of superimposed frames, sausage linking members on the frames for forming links in filled sausage casings carried by the frames incidental to pressure applied by superposition of the frames, and means for laterally shifting the applied pressure transversely of the fitted sausage casings.

2. A sausage linking apparatus including a plurality of superimposed frames, sausage linking members on the frames for forming links in filled sausage casings carried by the frames incidental to superposition of the frames, and means for effecting lateral oscillatory movement of a frame incidental to superposition of one frame on another.

3. A sausage linking apparatus including a plurality of superimposed frames, sausage linking members on the frames for forming links in filled sausage casings carried by the frames incidental to superposition of the frames, and means on one of the frames and engaging another to effect lateral oscillatory shifting movement of one frame during its movement in superposition on another frame.

4. A sausage linking apparatus including a plurality of superimposed frames, sausage linking members on the frames for forming links in filled sausage casings carried by the frames incidental to superposition of the frames, and cam guide means on one frame engageable with an adjacent frame to effect reciprocatory movement of the frame during superposition.

5. A sausage linking apparatus including a plurality of superimposed frames, sausage linking members in the frames for forming links in filled sausage casings carried by the frames incidental to superposition of the frames, and guide means engageable with the frames incidental to superposition to effect reciprocatory movement of the frames.

6. A sausage linking apparatus including a plurality of spaced members having seats for a stuffed sausage casing and having pressing portions below said seats coacting with the seats of similar superimposed members.

7. A sausage linking apparatus including a set of spaced members having seats for a stuffed sausage casing and having portions coacting with the seats of a second set of spaced members, and means for effecting lateral shifting movement of said members during superposition of one of said sets on the other.

8. A sausage linking apparatus including superimposed frames, plate members supported by said frames and having a series of V-shaped notches in their upper edges for seating stuffed sausage casing, and arcuate shaped notches in their lower edges to cooperate with the V-shaped notches of a lower frame to form the sausage casing into links.

9. A sausage linking apparatus including a frame, plate members supported by the frame and having a series of V-shaped notches in their upper edges, arcuate shaped notches in their lower edges, spacers on the frame, and cam guide members carried by said spacers for effecting reciprocatory movement of the frame when said frame is superimposed on a similar frame.

10. A sausage linking apparatus including a plurality of superimposed frames, sausage linking members on each of the frames for supporting stuffed sausage casing and having portions cooperating with the linking members of an adjacent frame to form links in the casing, and means for spacing the frames to provide spaces between the casings supported by the respective frames.

11. A sausage linking apparatus including a plurality of superimposed frames, sausage linking members on each of the frames for supporting stuffed sausage casing and having portions cooperating with the linking members of an adjacent frame to form links in the casing, means for spacing the frames to provide spaces between the casings supported by the respective frames, and guides carried by one frame and having zigzag shaped portions engageable with an adjacent frame to effect reciprocation of one of said frames.

12. A sausage linking apparatus including a frame, plate members supported by the frame and having a series of V-shaped notches in their upper edges, arcuate shaped notches in their lower edges, spacers on the frame, and cam guide members carried by said spacers for effecting reciprocatory movement of the frame when said frame is superimposed on a similar frame, said plate members being shaped to form stiffening ribs between said edges.

13. A sausage linking apparatus including superimposed frames, plate members supported by the frames and having a series of V-shaped notches in their upper edges terminating in substantially semi-circular shaped clamping portions to cooperate with lower edges of corresponding plate members on a superimposed frame, and means for oscillating the uppermost frame incidental to its superposition on the lower frame.

14. The method of linking filled sausage casings including applying pressure to the casing at spaced points in one direction, and simultaneously shifting the point of applied pressure transversely of the casing to squeeze the filling away from said points at which the pressure is applied and to constrict said casing.

15. The method of producing linked sausages including supporting a filled sausage casing at a plurality of spaced points, applying pressure to the casing directly over said points of support, and simultaneously shifting the points of application of said pressure whereby the points move laterally and reciprocally across the casing to squeeze the filling away from said points of support to form constrictions in said casing for producing sausage links.

16. A sausage linking apparatus including a frame, and spaced cross members on the frame including plates having double reverse bends intermediate the upper and lower edges thereof to form stiffening flanges and having projecting ends supported by the frame, said upper portions of the plates having notches for seating a stuffed sausage casing.

17. A sausage linking apparatus including a frame, and spaced cross members on the frame including plates having double reverse bends intermediate the upper and lower edges thereof to form stiffening flanges and having projecting ends supported by the frame, said upper portions of the plates having notches for seating a stuffed sausage casing and the lower portion having substantially arcuate notches to cooperate with a similar frame for forming the stuffed sausage casing into links.

LEWIS C. COREY.